March 29, 1955     E. N. MEAKIN     2,704,869
APPARATUS FOR THE STERILIZATION OF COTTONSEED
Filed Oct. 28, 1949     4 Sheets-Sheet 1
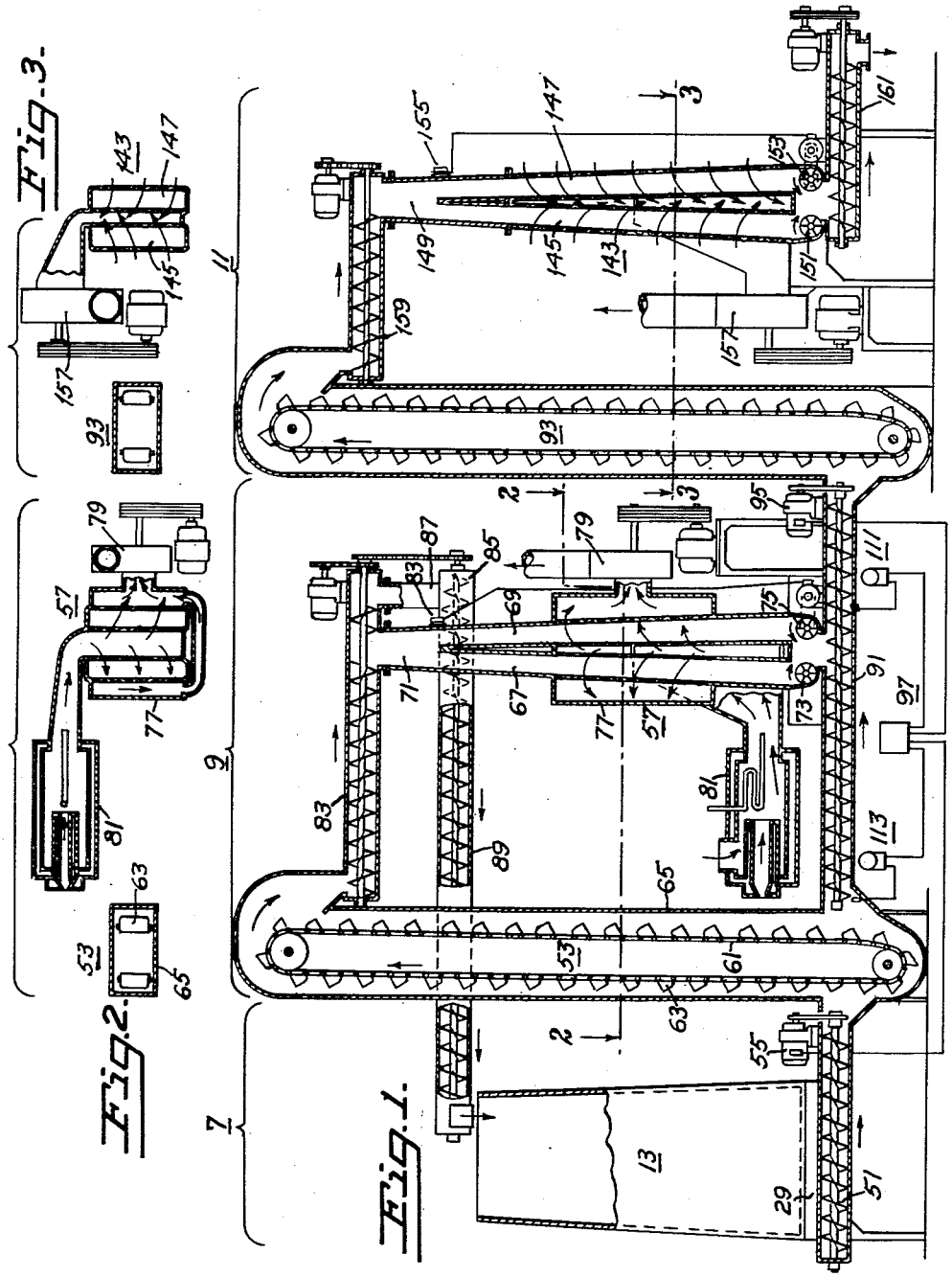
INVENTOR.
EDGAR N. MEAKIN
BY
Bruce & Brosler
HIS ATTORNEYS March 29, 1955 E. N. MEAKIN 2,704,869
APPARATUS FOR THE STERILIZATION OF COTTONSEED
Filed Oct. 28, 1949 4 Sheets-Sheet 2

INVENTOR.
EDGAR N. MEAKIN
BY
Bruce & Brosler
HIS ATTORNEYS

March 29, 1955   E. N. MEAKIN   2,704,869
APPARATUS FOR THE STERILIZATION OF COTTONSEED
Filed Oct. 28, 1949   4 Sheets-Sheet 3

INVENTOR.
EDGAR N. MEAKIN
BY
Bruce & Brosler
HIS ATTORNEYS

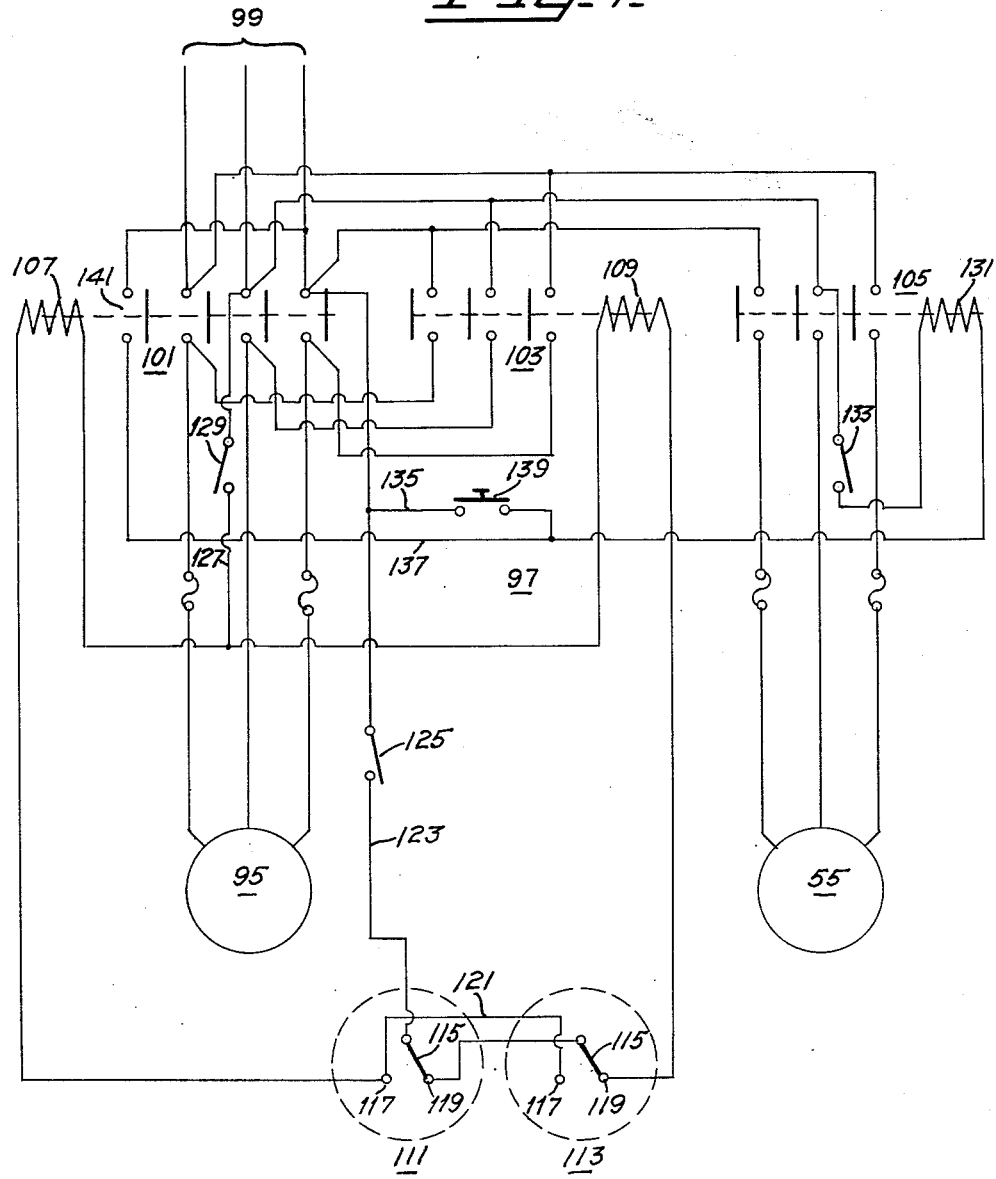

United States Patent Office 2,704,869
Patented Mar. 29, 1955

2,704,869

APPARATUS FOR THE STERILIZATION OF COTTONSEED

Edgar N. Meakin, Hillsborough, Calif.

Application October 28, 1949, Serial No. 124,104

5 Claims. (Cl. 21—94)

My invention relates to apparatus for and a method of treating cottonseed, and more particularly with regard to sterilization thereof and the elimination of spontaneous combustion in the storing of cottonseed.

In cotton areas infested with the pink bollworm, government requirements call for the sterilization of the cottonseed to destroy the larva of such worms and thereby inhibit the growth and spread of such infestations, the minimum requirements in this connection being to heat the seed to a temperature of 150 to 165 degrees Fahrenheit for at least 30 seconds.

The apparatus of the present invention is intended, not only to fulfill these requirements, but to do so in a manner (1) which is rapid, (2) which will treat the seed uniformly, (3) which will discharge the treated seeds at substantially ambient or room temperature, (4) which will preclude escape of seeds before they are fully treated, (5) which will not impair the ability of the seeds to germinate, (6) which will not destroy the by-products such as oil and lint to be derived commercially from such seeds, or impair the quality thereof, and (7) which will eliminate spontaneous combustion in the storing of such seeds.

The last mentioned advantage is of extreme importance to the industry, inasmuch as the storing of seed, treated by other methods, creates the hazard of fire through spontaneous combustion, and extraordinary safeguards and precautions must therefore be resorted to, to reduce such hazard and the losses therefrom.

For details of the apparatus in its preferred form and the method involved, reference will be made to the accompanying drawings wherein—

Figure 1 is an elevational view in section through the system apparatus of the present invention;

Figure 2 is a view in section taken in the plane 2—2 of Figure 1;

Figure 3 is a view in section taken in the plane 3—3 of Figure 1;

Figure 7 illustrates an electrical control circuit involved in the system of Figure 1.

Figure 4:
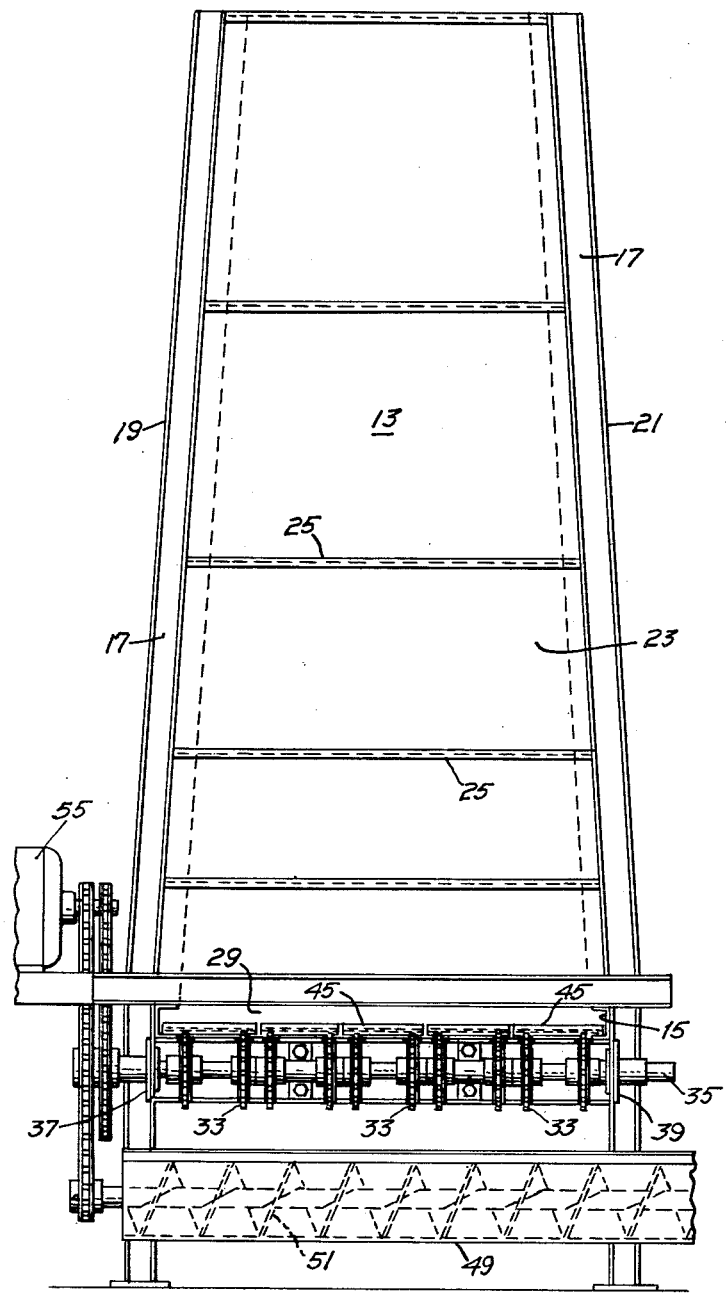
Figure 4 is a front elevational view of a storage feeder bin constituting one of the components of the system of Figure 1.

Although all components of the system are intimately associated, both structurally and functionally, to accomplish the results of the present invention, the system may, for convenience of description, be considered as involving a storage feeder bin section 7, a sterilizing section 9, and a cooler section 11.

The feeder bin section involves primarily a storage feeder bin 13, for storing the raw seed to be treated in the system, such bin involving a horizontal rectangular frame 15 of structural beam members supported at an elevation above ground by vertically disposed steel beams 17 which extend above the horizontal frame to provide beam supports for the side walls 19 and 21 and end walls 23 and 25 of the bin, which walls are preferably fabricated from sections of sheet metal united along their adjacent horizontal edges on their outer surfaces by reinforcing cross-members 25.

The bin floor 27 of any suitable material, may be laid across the horizontal frame 15.

Both end walls terminate with their lower edges in spaced relationship to the floor to provide passage 29 for a bin unloading means. Such unloading means involves a plurality of pairs of endless chains 31 mounted at one end about drive sprockets 33, each fixed to a common shaft 35 journaled in bearing brackets 37 and 39 on the front member of the floor frame. At the other end, the chains are supported about a corresponding number of idler sprockets 41 similarly supported on the rear member of the floor frame. The disposition of the sprockets is such as to cause the upper reach of each chain to move along or in close proximity to the floor of the bin.

Figure 5:
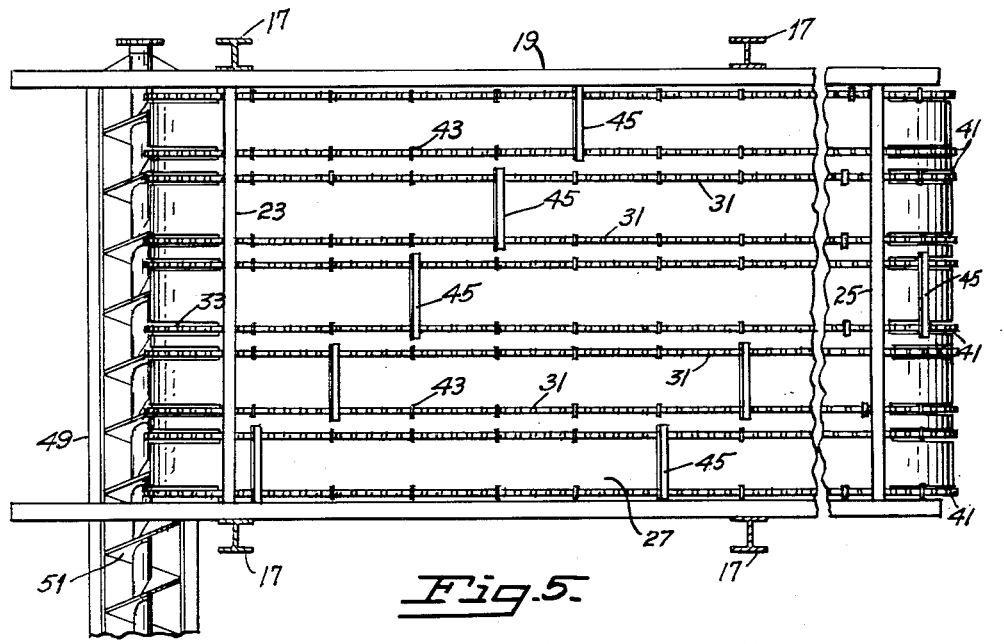
Figure 5 is a fragmentary view in the plane 5—5 of Figure 4.
Figure 6:
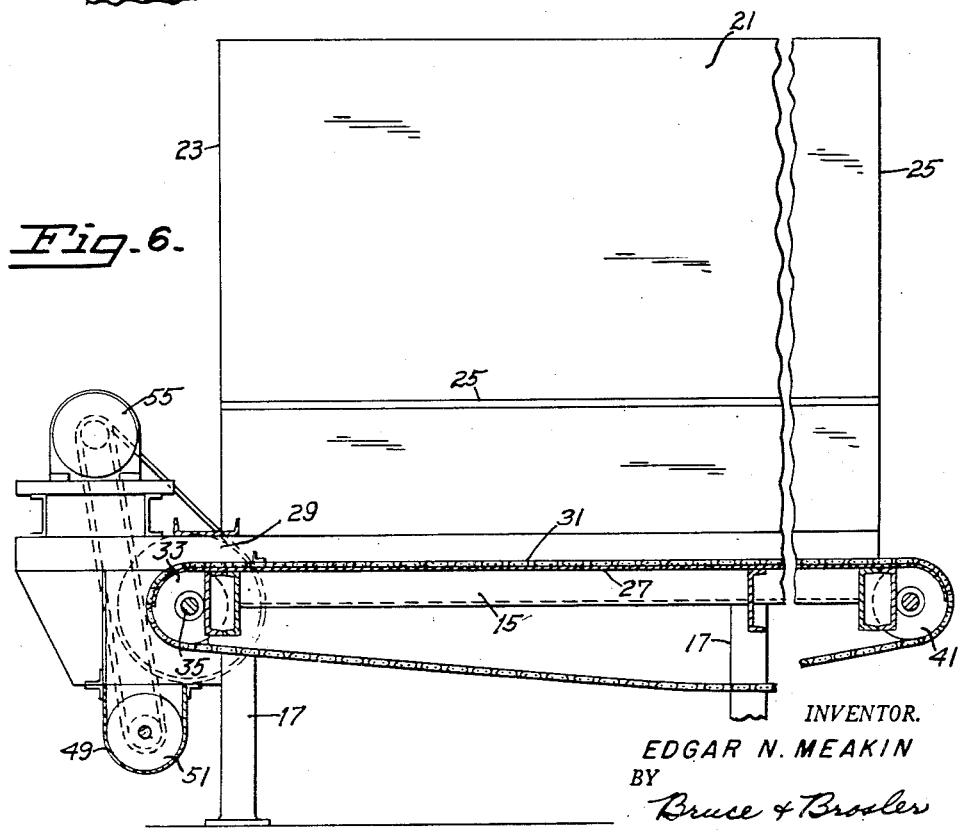
Figure 6 is a fragmentary view in section in the plane 6—6 of Figure 4.

At spaced intervals along each chain, the chain carries a grooving element 43 which during movement of the chain is adapted to tear out a groove in the bottom of the contents of the bin, while at less frequent intervals, each pair of chains is equipped with cleats 45 which are adapted to skim off the material at the bottom of the pile lying between such grooves. Such material is discharged at the front end of the bin into a conveyor 47 preferably of the screw type which is supported just below the front edge of the bin floor in a position to catch the material so discharged. The cleats are preferably staggered, as depicted in Figure 5, to assure a more uniform feeding of material to an elevator 53.

The screw conveyor comprises a trough 49 supported from the lower edges of the bearing brackets, and in the trough is rotatably disposed the screw member 51, the conveyor extending beyond the side wall 21 of the bin to connect up with and supply the elevator 53, constituting an element of the sterilizing section of the system.

The drive sprocket shaft 35 and the conveyor screw 51 are each driven through its own individual belt connection to a common motor 55 mounted on a platform adjacent the bin. This assures maintained correlation between the feeding rate of the bin unloading means and the operating capacity of the associated conveyor.

In fabricating the bin, I prefer to taper the same somewhat to give it a greater cross sectional area at the bottom. With such construction, the material stored in the bin for feeding into the system, will have less tendency to pack solid and will thereby assure downward movement of the material in the bin as such material is removed from the bottom of the pile to the screw conveyor.

The sterilizer section of the system involves a sterilizer 57 fed from the elevator 53, which is preferably of the vertically disposed bucket type, that is, it is made up of an endless chain or carrier 61 on which are carried numerous buckets or scoops 63, the carrier and buckets being entirely enclosed within a housing 65 which is designed to receive material at the bottom end from the screw type conveyor associated with the storage feed bin, and at its upper end, the elevator has a discharge opening.

The sterilizer itself, is of the column type described in detail in and forming the subject matter of my co-pending application for Heat Treatment of Flowable Material, Serial No. 100,913, filed June 23, 1949. Such column type sterilizer comprises briefly, a pair of slightly tapered columns 67 and 69 terminating at their upper ends in a common hopper 71, and disposed at their lower ends is a pair of bucket wheels 73 and 75, the direction of rotation of which is toward each other, whereby material descending in the columns will be discharged centrally of the sterilizer. The rate of rotation of the bucket wheels is adjusted to the rate of feed of material into the columns so that the columns may be maintained full at all times during operation.

The sterilizer is constructed of imperforate walls except for certain intermediate sections which are screened. By means of a manifold 77 connected to a duct leading to the intake of a circulating blower 79, hot air mixed with water vapor or steam is adapted to be pulled through each column from the space between such columns, into which space such mixture is discharged from a suitable furnace 81.

As pointed out in my aforementioned application, the use of water vapor or steam at approximately 600 degrees Fahrenheit in the air stream effects a rapid rise in the temperature of the seed to the required value of the order of 150 to 165 degrees Fahrenheit for sterilization, and that such rise can be effected in a matter of about two minutes, which will allow ample time for maintaining such sterilization temperature for the required minimum period of at least thirty seconds.

The seed to be sterilized is fed into the hopper of the sterilizer from the upper end of the bucket elevator by a screw type conveyor 83 leading from the discharge opening of the elevator to the hopper or upper end of the sterilizer.

If for some reason or other, the level in the hopper should drop below a certain minimum, which could be caused by insufficient supply from the elevator, it becomes necessary to temporarily halt movement of the bucket wheels to permit the level to again be built up to a value which will assure efficient operation of the apparatus.

Such interruptions of the bucket wheels have been accomplished through the use of a level-responsive device 83 which is sensitive to a drop in level of material in the hopper below such predetermined position. Such device and its mode of operation, constitutes the subject matter of Patent No. 1,951,980 and need not be referred to in detail at this time. Its sole function is to start and stop the rotation of the bucket wheels in accordance with changes in level of material in the hopper.

Under normal conditions, to assure against lowering of the level of material in the hopper of the sterilizer, it is preferred to supply to the hopper of the sterilizer, seed slightly in excess of that required to maintain the sterilizer full at all times. Inasmuch as the constant supplying of an excess quantity would ultimately choke up the system, I provide an extension 85 to the screw conveyor which feeds the hopper of the sterilizer, such excess seeds then being transferred to the extension from which it may be dropped through a connecting pipe 87 to one end of a return conveyor 89 preferably of the screw type, which in turn will conduct such excess seeds back to the storage feed bin.

At its lower end, the discharge opening of the sterilizer is crossed by a screw type conveyor 91 leading in one direction to the input opening of a second bucket type elevator 93 and in another direction to the lower end of the first elevator 53, whereby the discharge from the sterilizer may be conveyed to either of said elevators depending on the direction of operation of the sterilizer discharge conveyor. Such alternative direction of operation of this screw type conveyor is made dependent upon the temperature of the seed being discharged from the sterilizer, and this makes it possible to recirculate the output of the sterilizer until such output has met the minimum requirements for sterilization. Such precautions are usually necessary during the period in which the sterilizer is being brought up to heat, following which the system may revert to normal operation through reversal of the rotation of the sterilizer discharge conveyor, which will then function to carry the output of the sterilizer to the second elevator.

The rotation of the sterilizer discharge conveyor 91 is controlled by a reversible motor 95 mounted at the drive end of the conveyor adjacent the elevator 93. Its direction of rotation is correlated to the temperature of the sterilizer discharge as well as to the operation of the storage bin discharge conveyor motor 55, by an interconnecting electrical control circuit 97. Both motors are preferably of the three-phase type and operate from a three-phase power source 99, the sterilizer discharge conveyor motor being connectible to such power source through a magnetically operated reversing circuit involving a pair of magnet switches 101 and 103, while the storage bin discharge conveyor motor, which is operated in one direction only, is connectible to the power source through a single magnetic switch 105.

Each of the magnet switches in the reversing circuit includes a coil 107 and 109, respectively, and three pairs of normally open, bridgeable contacts for selectively connecting the sterilizer discharge conveyor motor to the power source, to control its direction of rotation. One of these coils, 107, when energized, results in forward rotation of the motor 95, while the other coil, 109, when energized, results in reverse operation.

The coils 107, 109 are connectible, one to the exclusion of the other, across one phase of the power source, and the selective energization and deenergization thereof to determine the proper direction of rotation of the motor is determined by a pair of thermostats 111, 113, respectively, one associated with the forward discharge portion of the conveyor 91 at the discharge end of the sterilizer, and the other disposed in association with the reverse discharge end of the same conveyor.

Each of these thermostats involves a thermostatic switch arm 115 adapted to effect contact with either of a pair of contacts 117, 119, dependent upon the temperature condition of the thermostat, that is, for a low temperature condition, the switch arm will contact, let us say, the right hand or low temperature contact 119, while for a high temperature, it will swing over to the other or high temperature contact 117.

In connecting the thermostats into the circuit, the high temperature contacts are electrically tied together by a line 121, while the low temperature contact of the thermostat 111 is connected to the switch arm of the thermostat 113. One line 123 of the single phase of the power supply connects through a manually closable switch 125 to the switch arm of the thermostat 111. This line is connectible to one side of the forward winding 107 through the high temperature contact of that same thermostat, and is alternatively connectible to one side of the reverse winding 109 when the switch arms of both thermostats are in contact with their associated low temperature contacts. The energizing circuits of both windings are completed through a common return line 127 to the other side of the single phase utilized, such return line preferably including a manually closable switch 129.

The magnet switch 105 includes a winding 131 which is also connectible in circuit across a single phase of the power supply. One side of this coil is connected to one wire of said single phase through a manually closable switch 133, while the other side of the coil is selectively connectible to the other side of the single phase through either of a pair of parallel branch circuits 135, 137, one branch including a manually depressible switch 139, while the other branch circuit includes a pair of bridgeable contacts 141 associated with the aforementioned forward winding 107.

When starting up the system of Figure 1, the system may or may not be filled with cottonseed, depending on previous operations, but in any event at the time of starting, the temperature of the seed being discharged from the sterilizer is apt to be below sterilization temperature, and consequently both thermostats will have their switch arms in contact with the low temperature contacts. This means that the motor driving the sterilizer discharge conveyor will be connected for reverse operation, whereby any material in the sterilizer will, upon being discharged therefrom, be returned to the sterilizer elevator for recirculation through the sterilizer.

If the system is empty or only partially full, it becomes essential also during the starting up period, to see that the system becomes full and to assure continued supply of cottonseed to the system, sufficient to maintain the same in its full condition.

Consequently, in starting up the system under the aforementioned conditions, power is first applied to the magnet switch circuits associated with the reversing motor, by the manual closing of the switches 125, 129. At the same time, the switch 133 in the single phase line to the magnet winding 131 is closed and the switch 139 in the line to the other side of this winding is held down to apply power to this winding.

The result of the above operations is to energize the reverse winding 109 and cause the motor 95 to operate in reverse, while at the same time, the bin discharge conveyor motor 55 becomes energized and causes material from the bin to be fed to the sterilizer elevator. This latter motor is maintained energized until the system becomes full, which will be evidenced by the return of excess cottonseed to the storage bin by the return conveyor 89. When this occurs, the manually depressed switch may be released and thus restored to its open condition to temporarily halt the operation of the bin discharge conveyor motor until the temperature condition in the sterilizer has reached the proper value for sterilization purposes.

When this condition obtains, the thermostat 113 will respond, whereby the reverse winding 109 will be disconnected from the circuit and the forward winding 107 will be connected in the circuit, to thereby reverse the direction of rotation of the conveyor 91. Thus the sterilized cottonseed will then be carried to the elevator 93, during which, the thermostat 111 will be exposed to the temperature of such seed which will cause its switch arm to swing over to the high temperature contact to effect a holding circuit for the forward coil. Thereafter, should the thermostat 113 cool down, so as to effect contact with the low temperature contact therein, the forward rotation of the motor 95 will not be affected.

At the moment the forward winding 107 becomes energized, the pair of associated contacts 141 will be bridged, thus bringing the magnet winding 131 back into the circuit to start operation of the motor 55 and supply raw cottonseed from the bin 13 to the elevator 53 for sterilization.

The elevation 93 is similar to that of the elevator 53 and is associated with a cooler 143 of the type disclosed and claimed in my co-pending application for Apparatus for the Treatment of Flowable Material, Serial No. 48,146, filed September 7, 1948, now abandoned.

Briefly, this involves a pair of spaced columns 145, 147 tapering upwardly to merge into a common hopper 149. Disposed at the lower end of the cooler is a pair of bucket wheels 151, 153 corresponding in structure and function to those of the sterilizer. A level-responsive device 155 similar in structure and function to that associated with the sterilizer, is mounted at the upper end of the cooler and is electrically associated with the bucket wheels to maintain a full condition of the cooler at all times.

The cooler differs from the sterilizer primarily in having the side walls of each column perforated or screened, with preferably the outer walls exposed to the atmosphere and the inner walls exposed only to the suction end of a motor driven blower 157 which connects with the space between the columns to withdraw the air from such space and cause the cooler air of the atmosphere to pass through the columns normal to the flow of material, such material being supplied to the hopper of the cooler from the upper end of the elevator by means of a screw conveyor 159.

At the lower end of the cooler is disposed a screw conveyor 161 adapted to receive the output of the cooler and carry the same for discharge at a remote point.

The rate of flow of sterilized cottonseed through the cooler is correlated to that of the sterilizer so that an uninterrupted flow of the cottonseed will be maintained at all times throughout the system. The cooling effect of the cooler, under these conditions, is such as to reduce the temperature of the sterilized seed to room or ambient temperature in a brief period of the order of two or two and a half minutes.

A feature of the above described system resides in the fact that no seed can escape therefrom except by way of the cooler discharge conveyor provided for this purpose, and that the thermostatically controlled motor control system assures that every seed reaching such conveyor will necessarily have been sterilized. Thus the danger of spreading of any infestation through subsequent handling of the treated seed, is eliminated entirely.

The treatment of cottonseed in accordance with the aforementioned procedure has no deleterious effect on the seed, either from the viewpoint of its germinating properties or the quality of the lint or oil obtained therefrom through further processing.

I have discovered that cottonseed when treated under the conditions prevailing in the system described above, is not subject to spontaneous combustion when stored under conditions which might otherwise lead to spontaneous combustion. I attribute this largely to the combination of the steps involving the raising of the temperature of the cottonseed to sterilizing temperature and then rapidly dropping the same to room or ambient temperature, the latter function being that of the cooler. Of importance in this connection is the fact that the sterilizer effectively reaches each individual cottonseed, thereby assuring that each seed in the end product will have been exposed to those conditions to which applicant attributes the elimination of spontaneous combustion.

While I have described by invention in its preferred form and in considerable detail, the same is subject to alteration and modification without departing from the underlying principles thereof, and I accordingly do not desire to be limited in my protection to the specific details illustrated and described, except as may be necessitated by the appended claims.

I claim:

1. A system for the treatment of cottonseed or the like, comprising a column type sterilizer having an input opening at its upper end and a discharge opening; an elevator having an input opening at its lower end and a discharge opening at its upper end; means for feeding raw cottonseed to said elevator at its input opening; means for conducting the discharge from said elevator to the upper end of said column type sterilizer; a conveyor disposed across the discharge opening of said sterilizer, said conveyor leading in either of two directions depending on direction of operation and adapted, in one such direction of movement, to carry the discharge of said sterilizer back to the lower end of said first elevator; and means for determining the direction of operation of said sterilizer discharge conveyor in response to the temperature of the seed being discharged from said sterilizer.

2. A system for the treatment of cottonseed or the like, comprising a column type sterilizer having an input opening at its upper end and a discharge opening; a vertically disposed bucket type elevator having an input opening at its lower end and a discharge opening at its upper end; means for feeding raw cottonseed to said elevator at its input opening; means for conducting the discharge from said elevator to the upper end of said column type sterilizer; means for returning any excess of seed back to said elevator feeding means; a second vertically disposed bucket type elevator having an input opening at its lower end and a discharge opening at its upper end; a conveyor disposed across the discharge opening of said sterilizer, said conveyor leading in one direction to the input opening of said second elevator and in the other direction to said first elevator whereby the discharge from said sterilizer may be conveyed to either of said elevators depending on the direction of operation of said sterilizer discharge conveyor; means for determining the direction of operation of said sterilizer discharge conveyor in response to the temperature of the seed being discharged from said sterilizer; a column type cooler having an input opening at its upper end and a discharge opening at its lower end; and means for conducting the discharge of the last mentioned elevator to the input opening of said cooler.

3. A system for the treatment of cottonseed or the like, comprising a column type sterilizer having an input opening at its upper end and a discharge opening; a vertically disposed bucket type elevator having an input opening at its lower end and a discharge opening at its upper end; means for feeding raw cottonseed to said elevator at its input opening, said means involving a storage feed bin having a discharge opening at the bottom thereof and a screw type conveyor adjacent said bin discharge opening and leading to the input opening in said elevator; a screw type conveyor leading from the discharge opening of said elevator to the upper end of said column type sterilizer; a second vertically disposed bucket type elevator having an input opening at its lower end and a discharge opening at its upper end; a screw type conveyor disposed across the discharge opening of said sterilizer, said conveyor leading in one direction to the input opening of said second elevator and in another direction to the lower end of said first elevator whereby the discharge from said sterilizer may be conveyed to either of said elevators depending on the direction of operation of said sterilizer discharge conveyor; and means for determining the direction of operation of said sterilizer discharge conveyor in response to the temperature of the seed being discharged from said sterilizer.

4. A system for the treatment of cottonseed or the like, comprising a column type sterilizer having an input opening at its upper end and a discharge opening; a vertically disposed bucket type elevator having an input opening at its lower end and a discharge opening at its upper end; means for feeding raw cottonseed to said elevator at its input opening, said means involving a storage feed bin having a discharge opening at the bottom thereof and a screw type conveyor adjacent said bin discharge opening and leading to the input opening in said elevator; a screw type conveyor leading from the discharge opening of said elevator to the upper end of said column type sterilizer, said last conveyor having an extension terminating beyond said sterilizer to carry away seed in excess of the operating capacity of said sterilizer; means for returning such excess of seed back to said storage feed bin; a second vertically disposed bucket type elevator having an input opening at its lower end and a discharge opening at its upper end; a screw type conveyor disposed across the discharge opening of said sterilizer, said conveyor leading in one direction to the input opening of said second elevator and in another direction to the lower end of said first elevator whereby the discharge from said sterilizer may be conveyed to either of said elevators depending on the direction of operation of said sterilizer discharge conveyor; and means for determining the direction of operation of said sterilizer discharge conveyor in response to the temperature of the seed being discharged from said sterilizer.

5. A system for the treatment of cottonseed or the like, comprising a column type sterilizer having an input opening at its upper end and a discharge opening; a vertically disposed bucket type elevator having an input opening at its lower end and a discharge opening at its upper end; means for feeding raw cottonseed to said elevator at its input opening, said means involving a storage feed bin having a discharge opening at the bottom thereof and a screw type conveyor adjacent said bin discharge opening and leading to the input opening in said elevator; a screw type conveyor leading from the discharge opening of said elevator to the upper end of said column type sterilizer, said last conveyor having an extension terminating beyond said sterilizer to carry away seed in excess of the operating capacity of said sterilizer; means for returning such excess of seed back to said storage feed bin; a second vertically disposed bucket type elevator having an input opening at its lower end and a discharge opening at its upper end; a screw type conveyor disposed across the discharge opening of said sterilizer, said conveyor leading in one direction to the input opening of said second elevator and in another direction to the lower end of said first elevator whereby the discharge from said sterilizer may be conveyed to either of said elevators depending on the direction of operation of said sterilizer discharge conveyor; means for determining the direction of operation of said sterilizer discharge conveyor in response to the temperature of the seed being discharged from said sterilizer; a column type cooler having an input opening at its upper end and a discharge opening at its lower end; and a screw type conveyor leading from the discharge opening of the last mentioned elevator to the input opening of said cooler.

References Cited in the file of this patent

UNITED STATES PATENTS

| | | |
|---|---|---|
| 807,910 | Brown | Dec. 19, 1905 |
| 848,577 | Still | Mar. 26, 1907 |
| 955,046 | Boyer | Apr. 12, 1910 |
| 983,198 | Applegate | Jan. 31, 1911 |
| 992,295 | Tiemann | May 16, 1911 |
| 1,076,447 | Pindstofte | Oct. 21, 1913 |
| 1,108,539 | Zahm | Aug. 25, 1914 |
| 1,510,610 | Rylander | Oct. 7, 1924 |
| 1,675,123 | Metzger et al. | June 26, 1928 |
| 1,853,335 | Cook | Apr. 12, 1932 |
| 1,948,228 | Urban | Feb. 20, 1934 |
| 2,044,744 | Hansen | June 16, 1936 |
| 2,059,835 | Worthing et al. | Nov. 3, 1936 |
| 2,191,893 | McDonald et al. | Feb. 27, 1940 |
| 2,410,851 | Welty | Nov. 12, 1946 |